(12) United States Patent
Huang et al.

(10) Patent No.: US 12,517,586 B2
(45) Date of Patent: Jan. 6, 2026

(54) MULTI-FUNCTIONAL FEEDBACK DEVICE, HAPTIC FEEDBACK SYSTEM, AND AR/VR GLASS

(71) Applicant: AAC Technologies (Nanjing) Co., Ltd., Nanjing (CN)

(72) Inventors: Xingzhi Huang, Nanjing (CN); Wei Song, Nanjing (CN); Lubin Mao, Nanjing (CN); Yun Tang, Nanjing (CN); Jie Ma, Nanjing (CN); Ronglin Linghu, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 177 days.

(21) Appl. No.: 18/327,031

(22) Filed: May 31, 2023

(65) Prior Publication Data
US 2024/0220020 A1 Jul. 4, 2024

Related U.S. Application Data

(63) Continuation of application No. PCT/CN2023/086802, filed on Apr. 7, 2023.

(30) Foreign Application Priority Data

Dec. 30, 2022 (CN) .......................... 202211729254.8

(51) Int. Cl.
*H04R 1/00* (2006.01)
*B06B 1/04* (2006.01)
(Continued)

(52) U.S. Cl.
CPC .............. *G06F 3/016* (2013.01); *B06B 1/045* (2013.01); *G06F 1/1688* (2013.01); *G06F 1/169* (2013.01);
(Continued)

(58) Field of Classification Search
CPC ........ G06F 3/016; G06F 1/163; G06F 1/1688; G06F 1/169; G06F 1/1694; G06F 3/011; G06F 3/017; G06F 3/02; G06F 3/0202; G06F 3/0346; G06F 3/03547; G06F 3/044; G06F 3/048; G06F 3/0485;
(Continued)

(56) References Cited

U.S. PATENT DOCUMENTS 9,538,292 B1 * 1/2017 Boyd ................ H04R 9/025
2021/0067877 A1 * 3/2021 Jeon ................ H04S 1/007

* cited by examiner

*Primary Examiner* — Dionne Pendleton
(74) *Attorney, Agent, or Firm* — Wiersch Law Group

(57) ABSTRACT

A multi-functional feedback device, a haptic feedback system, and augmented reality (AR)/virtual reality (VR) glasses are provided. In the multi-functional feedback device, a vibration unit and a touch unit are assembled in a housing and share a magnetic circuit unit, which not only realizes transmission of a sound signal, but also realizes haptic feedback through a vibration signal, achieving a multi-functional feedback effect. Due to sharing a same magnetic circuit unit, costs can be saved, and an occupied space can be saved. The haptic feedback system includes the multi-functional feedback device. The vibration unit and the touch unit can be separate power amplifiers or a common power amplifier. In the AR/VR glasses, the haptic feedback system is assembled in a glasses frame, which can realize a reminder through vibration or sound on a head when used by a user, so as to meet diverse requirements.

10 Claims, 14 Drawing Sheets

(51) Int. Cl.
*G06F 1/16* (2006.01)
*G06F 3/01* (2006.01)
*H04R 1/24* (2006.01)
*H04R 9/02* (2006.01)

(52) U.S. Cl.
CPC ............ *G06F 3/011* (2013.01); *H04R 9/025* (2013.01); *H04R 2400/03* (2013.01)

(58) Field of Classification Search
CPC ........ G06F 3/04883; G06F 3/14; G06F 3/165; G06F 3/167; G06F 1/1652; G06F 1/1616; G06F 2200/1637; G06F 1/1641; G06F 3/038; G06F 3/0412; G06F 3/0483; G06F 3/1431; G06F 3/1446; G06F 2203/04103; G06F 3/0416; G06F 1/1626; G06F 1/1632; G06F 3/041; G06F 3/0488; G06F 1/1677; G06F 2203/04105; G06F 2203/04808; G06F 1/1601; G06F 1/1615; G06F 1/1618; G06F 1/1624; G06F 1/1647; G06F 1/1654; G06F 1/1656; G06F 1/1662; G06F 1/1671; G06F 1/1673; G06F 1/1675; G06F 1/1681; G06F 1/1684; G06F 1/1686; G06F 1/1692; G06F 11/32; G06F 2200/1614; G06F 2200/1636; G06F 2203/0338; G06F 2203/0339; G06F 2203/04101; G06F 2203/04104; G06F 3/005; G06F 3/015; G06F 3/03543; G06F 3/03545; G06F 3/0414; G06F 3/04144; G06F 3/04186; G06F 3/0421; G06F 3/0426; G06F 3/0445; G06F 3/045; G06F 3/046; G06F 3/0481; G06F 3/04815; G06F 3/0484; G06F 3/04842; H04R 9/025; H04R 1/02; H04R 1/028; H04R 2400/03; H04R 1/00; H04R 2499/11; H04R 3/00; H04R 7/18; H04R 9/06; H04R 1/023; H04R 1/025; H04R 1/24; H04R 1/2811; H04R 1/2834; H04R 1/288; H04R 11/02; H04R 2400/11; H04R 2420/07; H04R 2499/15; H04R 31/006; H04R 5/02; H04R 5/04; H04R 7/02; H04R 7/04; H04R 7/12; H04R 9/045; H04R 9/046; H02K 33/16; H02K 33/18; A45C 13/001; A45C 13/18; A45C 13/185; A45C 13/20; A45C 13/24; A45C 13/30; A45C 13/42; A45C 2011/188; A45C 2013/306; A45F 2005/006; A45F 2005/008; A45F 5/00; A45F 5/004; A45F 5/021; A45F 5/1508; A45F 5/155; A47C 7/72; A61B 5/0022; A61B 5/1116; A61B 5/4561; A63B 24/0062; B60N 2/0021; B60N 2/003; B60N 2/90; B60N 2/976; B60N 2002/981; B60N 2210/12; B06B 1/04; B06B 1/045; B60R 11/02; B60R 16/02; E05B 73/0005; G01S 5/0036; G01S 5/0226; G01S 5/0231; G04G 21/04; G04G 21/08; G06K 19/0701; G06K 19/0702; G06K 19/0708; G06K 19/0723; G06K 19/07711; G06K 19/07758; G06K 19/07766; G06K 19/07773; G06K 19/07779; G06K 7/0008; G06K 7/10396; H05K 1/141; H05K 2201/1003; H05K 2201/10083; H05K 2201/10272; H05K 2201/1028; H05K 3/341; H05K 3/3442; H04W 12/02; H04W 12/03; H04W 12/33; H04W 12/63; H04W 4/029; H04W 88/06; H04S 1/007; H04M 1/02; H04M 1/03; H04M 1/21; H04M 1/725; H04M 19/047; H04M 2250/22; H04M 1/0266; H04M 1/0283; H04M 2250/12; H04M 1/0216; H04M 1/0241; H04M 1/0243; H04M 1/0247; H04M 1/0256; H04M 1/0268; H04M 1/236; H04L 2209/80; H04L 9/0825; H04L 9/16; H04L 9/30; H04B 1/3827; H04B 1/3888; H04B 1/717; H04B 5/79; H03K 17/955; H03K 17/962; H03K 2217/96062; H03K 17/964; H03K 17/965; H03K 17/967; H03K 2017/9613; H02P 25/034; H01R 4/28; H01Q 1/12; H01Q 1/2208; H01Q 1/2225; H01Q 1/2291; H01Q 1/273; H01Q 21/06; H01Q 21/28; H01Q 5/25; H01Q 5/378; H01Q 7/00; H01Q 9/42; H01M 50/109; H01M 50/184; G06T 13/40; Y02E 60/10; H01F 7/02; G09F 7/22; G09F 9/30; B32B 2457/208; B32B 7/12; Y10T 29/49002; Y10T 29/49117; Y10T 29/49826; F21Y 2115/10; F21V 11/14; G02F 1/13338; B29C 45/14467; G09G 2320/0261; G09G 2354/00; G09G 2380/02

See application file for complete search history.

MULTI-FUNCTIONAL FEEDBACK DEVICE, HAPTIC FEEDBACK SYSTEM, AND AR/VR GLASS

TECHNICAL FIELD

The present disclosure relates to the technical field of augmented reality (AR)/virtual reality (VR), and in particular, to a multi-functional feedback device.

BACKGROUND

A VR technology is a technology in which a computer simulates a virtual environment to give people a sense of environmental immersion. An AR technology is a technology that ingeniously integrates virtual information with the real world. Regardless of the VR or AR technology, related AR/VR products have a wide range of applications in fields such as research and development of cutting-edge weapons and aircrafts, visualization of data models, entertainment and art.

However, AR/VR products in the related art all send sound signals through speakers to realize reminders or game functions, but in actual use, the reminders only through sound cannot meet usage requirements of users.

Therefore, there is a need to provide a multi-functional feedback device.

SUMMARY

An objective of the present disclosure is to provide a multi-functional feedback device, which can solve the above deficiencies in the related art at least to some extent.

The technical solution of the present disclosure is as follows.

A multi-functional feedback device includes a frame, a magnetic circuit unit fixed in the frame, a vibration unit connected to the frame and driven by the magnetic circuit unit to produce sound along a thickness direction, and a touch unit arranged opposite to the vibration unit. The touch unit includes a driving part arranged apart from the magnetic circuit unit and driven by the magnetic circuit unit to vibrate along the thickness direction, a first elastic member connected to the driving part and fixed to the frame, and a touch material attached to a side of the first elastic member away from the driving part.

As an improvement, the magnetic circuit unit includes a first yoke fixedly connected to the frame, a magnet fixed in the first yoke, and a pole plate fixed to a side of the magnet close to the vibration unit, the first yoke including a receiving cavity, and the driving part is received in the receiving cavity.

As an improvement, the driving part includes an iron core fixedly assembled to a side of the first elastic member away from the touch material, and a coil sleeved on the iron core. The iron core and the coil are both accommodated in the receiving cavity.

As an improvement, the magnetic circuit unit further includes a pole plate ring fixed to the magnet and sleeved on the coil, and a gap is formed between the pole plate ring and the coil.

As an improvement, the magnet is provided with an avoiding groove communicated with the receiving cavity, and the pole plate ring is embedded in the avoiding groove.

As an improvement, the driving part further includes a second yoke fixed to the first elastic member and covering the iron core and the coil.

As an improvement, the first elastic member includes a sealing film, the sealing film being fixed to a side of the first yoke away from the vibration unit and being attached to the iron core and the coil respectively.

As an improvement, the touch material includes an extrapolation block, the extrapolation block being fixed to a side of the sealing film away from the iron core and the coil.

As an improvement, the magnetic circuit unit further includes a connector fixed between the pole plate and the first yoke.

As an improvement, a magnetic gap is formed between the first yoke and the magnet, and the vibration unit includes a diaphragm connected to the frame, a dome connected to the diaphragm, and a voice coil connected to the dome and inserted in the magnetic gap.

As an improvement, the multi-functional feedback device further includes two first flexible printed circuit boards symmetrically arranged at two ends of the magnetic circuit unit, respectively, and one of the two first flexible printed circuit boards has one end fixed to the frame and another end fixedly connected to a side of the voice coil away from the dome.

As an improvement, the multi-functional feedback device further includes a second elastic member arranged between the magnetic circuit unit and the driving part.

A haptic feedback system includes a control processing assembly, a power amplifier circuit electrically connected to the control processing assembly, and a multi-functional feedback device electrically connected to the power amplifier circuit. The control processing assembly is configured to receive and process an AR/VR signal to output an audio signal and a touch signal to the power amplifier circuit. The power amplifier circuit is configured to perform power amplification on the audio signal and the touch signal. The multi-functional feedback device includes a frame, a magnetic circuit unit fixed in the frame, a vibration unit connected to the frame and driven by the magnetic circuit unit to produce sound along a thickness direction, and a touch unit arranged opposite to the vibration unit. The touch unit includes a driving part arranged apart from the magnetic circuit unit and driven by the magnetic circuit unit to vibrate along the thickness direction, a first elastic member connected to the driving part and fixed to the frame, and a touch material attached to a side of the first elastic member away from the driving part. The vibration unit is configured to receive an audio signal after power amplification, and the touch unit is configured to receive a touch signal after power amplification.

As an improvement, the control processing assembly includes a microprogrammed control unit (MCU) controller, and a first chip processor and a second chip processor that are signal-connected to the MCU controller. The power amplifier circuit includes an audio power amplifier circuit electrically connected to the first chip processor and the vibration unit and a motor power amplifier circuit electrically connected to the second chip processor and the touch unit. The MCU controller is configured to receive and process the VR/AR signal to obtain a first signal and a second signal. The first chip processor is configured to receive and process the first signal to obtain the audio signal, and the second chip processor is configured to receive and process the second signal to obtain the touch signal. The audio power amplifier circuit is configured to perform power amplification on the audio signal; and the motor power amplifier circuit is configured to perform power amplification on the touch signal.

As an improvement, the vibration unit and the touch unit are connected in series, and the haptic feedback system further includes a capacitor connected in parallel with the touch unit. The control processing assembly includes an MCU controller and a signal processing assembly signal-connected to the MCU controller. The power amplifier circuit includes an audio power amplifier circuit electrically connected to the signal processing assembly and the vibration unit, and the vibration unit is electrically connected to the audio power amplifier circuit. The MCU controller is configured to receive and process the VR/AR signal to obtain a first signal and a second signal. The signal processing assembly is configured to receive and process the first signal and the second signal to obtain a mixed signal, the mixed signal including an audio signal corresponding to the first signal and a touch signal corresponding to the second signal. The audio power amplifier circuit is configured to perform power amplification on the mixed signal, the amplified mixed signal being transmitted to the vibration unit and the touch unit in sequence.

As an improvement, the processing an AR/VR signal to output an audio signal and a touch signal to the power amplifier circuit includes: calling a haptic feedback signal effect library as described in the AR/VR signal to obtain the touch signal, the touch signal being smaller than 80 Hz.

AR/VR glasses includes a glasses frame and a haptic feedback system arranged on the glasses frame. The haptic feedback system includes a control processing assembly, a power amplifier circuit electrically connected to the control processing assembly, and a multi-functional feedback device electrically connected to the power amplifier circuit. The control processing assembly is configured to receive and process an AR/VR signal to output an audio signal and a touch signal to the power amplifier circuit. The power amplifier circuit is configured to perform power amplification on the audio signal and the touch signal. The multi-functional feedback device includes a frame, a magnetic circuit unit fixed in the frame, a vibration unit connected to the frame and driven by the magnetic circuit unit to produce sound along a thickness direction, and a touch unit arranged opposite to the vibration unit. The touch unit includes a driving part arranged apart from the magnetic circuit unit and driven by the magnetic circuit unit to vibrate along the thickness direction, a first elastic member connected to the driving part and fixed to the frame, and a touch material attached to a side of the first elastic member away from the driving part. The vibration unit is configured to receive an audio signal after power amplification, and the touch unit is configured to receive a touch signal after power amplification.

Beneficial effects of the present disclosure are as follows. The present disclosure provides a multi-functional feedback device, a haptic feedback system, and AR/VR glasses. As described in the multi-functional feedback device of the present disclosure, a vibration unit and a touch unit are assembled in a housing and share a magnetic circuit unit, which not only realizes transmission of a sound signal, but also realizes haptic feedback through a vibration signal, achieving a multi-functional feedback effect. At the same time, due to sharing the magnetic circuit unit, costs can be saved, and an occupied space can be saved. The haptic feedback system includes the multi-functional feedback device. The vibration unit and the touch unit can be separate power amplifiers or a common power amplifier. In the AR/VR glasses, the haptic feedback system is assembled in a glasses frame, which can realize a reminder through vibration or sound on a head when used by a user, so as to meet diverse requirements.

DESCRIPTION OF EMBODIMENTS

Figure 1:
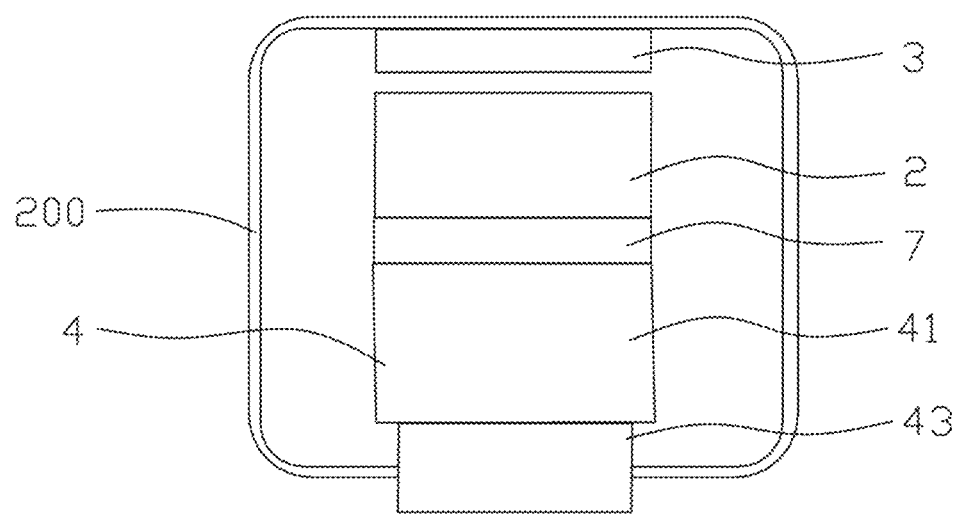
FIG. 1 is a conceptual diagram of a layout of functional modules of a multi-functional feedback device according to an embodiment of the present disclosure.
Figure 2:
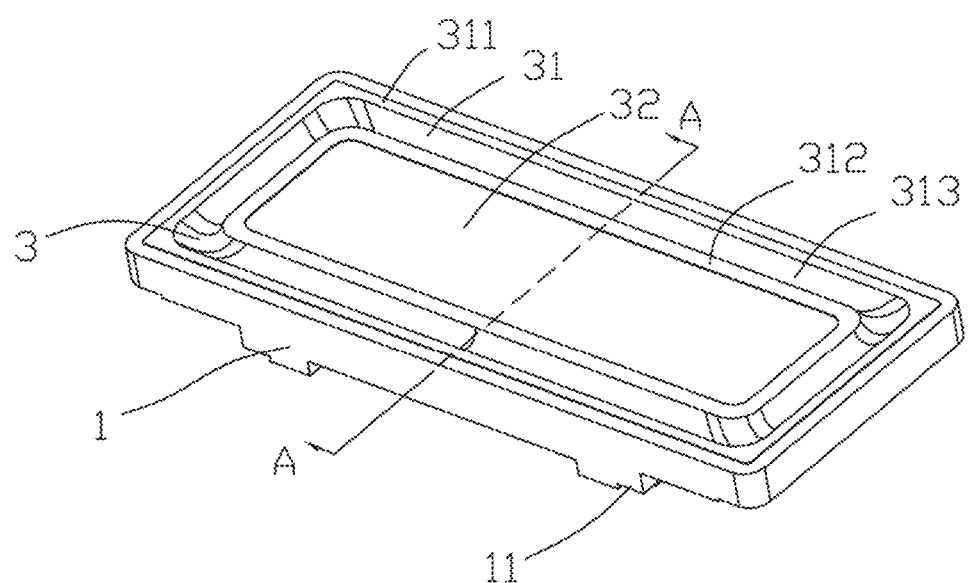
FIG. 2 is a schematic diagram of a three-dimensional structure of a multi-functional feedback device in a first implementation and a second implementation according to an embodiment of the present disclosure.

The present disclosure is further described below with reference to the accompanying drawings and embodiments.

An embodiment of the present disclosure provides a multi-functional feedback device. Referring to FIG. 1 to FIG. 8, the multi-functional feedback device includes a frame 1, a magnetic circuit unit 2 fixed in the frame 1, and a vibration unit 3 connected to the frame 1 and driven by the magnetic circuit unit 2 to produce sound along a thickness direction. The multi-functional feedback device includes a touch unit 4 opposite to the vibration unit 3. The touch unit 4 includes a driving part 41 spaced apart from the magnetic circuit unit 2 and driven by the magnetic circuit unit 2 to vibrate along the thickness direction, a first elastic member 42 connected to the driving part 41 and fixed to the frame 1, and a touch material 43 attached to a side of the first elastic member 42 away from the driving part 41.

In this embodiment, the vibration unit 3 is driven by the magnetic circuit unit 2 to produce sound along the thickness direction. The driving part 41 is elastically connected to the frame 1, and the magnetic circuit unit 2 drives the driving part 41 in the touch unit 4 to vibrate along the thickness direction, so that the driving part 41 drives the touch material 43 to vibrate to finally transmit a vibration signal to skin. The vibration unit 3 and the touch unit 4 are assembled in a housing and share the magnetic circuit unit 2, which not only realizes transmission of a sound signal, but also realizes haptic feedback through the vibration signal, achieving a multi-functional feedback effect. At the same time, due to the sharing of the magnetic circuit unit 2, costs can be saved, and an occupied space can be saved.

In some embodiments, referring to FIG. 2 to FIG. 8, the magnetic circuit unit 2 includes a first yoke 21 fixedly connected to the frame 1, a magnet 22 fixed in the first yoke 21, and a pole plate 23 fixed to a side of the magnet 22 close to the vibration unit 3. The first yoke 21 includes a receiving cavity 215, and the driving part 41 is received in the receiving cavity 215.

In some embodiments, the pole plate 23 has a plate-like structure and has a side in contact with a top surface of the magnet 22, and a bottom surface of the magnet 22 is in contact with a bottom surface of the first yoke 21.

In a first implementation and a second implementation, four sides of the first yoke 21 are respectively provided with groove walls 211 each extending from the bottom surface toward the magnetic circuit unit 2, a magnetic gap 216 is formed between the groove wall 211 and the magnet 22, and wall surfaces of two symmetrical groove walls 211 abut against an inner wall of the frame 1. Convex blocks 212 are arranged at four corners of the first yoke 21, positioning blocks 11 corresponding to positions of the convex blocks 212 are arranged at four corners of a bottom side of the frame 1, and a side wall of the convex block 212 abuts against a side wall of the positioning block 11. The first yoke 21 is also provided with a groove 213 on an inner side of the convex block 212, the frame 1 is correspondingly provided with a protruding structure 12, and the protruding structure 12 is located in the groove 213. At the same time, a limiting groove 13 is also provided on an inner side of the protruding structure 12, and a side corner 214 of the first yoke 21 is located in the limiting groove 13. Through the above structure, a stable connection between the first yoke 21 and the frame 1 is realized, and assembly between the first yoke 21 and the frame 1 is facilitated.

In a third implementation, the first yoke 21 is provided with groove walls 211 extending from the bottom surface toward the magnetic circuit unit 2 on two sides of the first yoke 21 respectively, and a magnetic gap 216 is formed between the groove wall 211 and the magnet 22. Grooves 213 are arranged at inner four corners of the first yoke 21, the frame 1 is correspondingly provided with a protruding structure 12, and the protruding structure 12 is located in the groove 213. At the same time, the magnetic circuit unit 2 includes a connector 25 fixed between the pole plate 23 and the first yoke 21. With the above structure, a stable connection between the first yoke 21, the frame 1, and the magnetic circuit unit 2 is realized, and at the same time, assembly between the first yoke 21, the frame 1, and the magnetic circuit unit 2 is facilitated. It should be understood that the connector 25 mainly plays a role of enhancing stability of the connection of the magnetic circuit unit 2 in the frame 1, and does not have a magnetic conduction effect.

In some embodiments, referring to FIG. 2 to FIG. 6, the driving part 41 includes an iron core 411 fixedly assembled to a side of the first elastic member 42 away from the touch material 43 and a coil 412 sleeved on the iron core 411, and the iron core 411 and the coil 412 are both accommodated in the receiving cavity 215.

In some embodiments, the coil 412 has a hollow structure, the iron core 411 is interspersed in the middle of the coil 412, the first yoke 21 is provided with a receiving cavity 215, the multi-functional feedback device includes a second flexible printed circuit board 6 connected to two ends of the receiving cavity 215 and having a top surface in contact with the driving part 41 and a bottom surface in contact with the first elastic member 42, the coil 412 is electrically connected to the second flexible printed circuit board 6, and the touch material 43 is in direct contact with the skin. Since the iron core 411 is made of a paramagnetic material, permeability is very high. After the iron core 411 is inserted inside the energized coil 412, the iron core 411 is magnetized by a magnetic field of the energized coil 412, so that magnetic induction intensity inside the iron core 411 is greatly improved, and the magnetized iron core 411 also becomes a magnet. In this way, two magnetic fields are superimposed on each other, so that magnetic properties of the coil 412 are greatly enhanced. The driving part 41 is elastically connected to the frame 1, the magnetic circuit unit 2 generates a driving force for the driving part 41 to vibrate along the thickness direction, and the driving part 41 gives a driving force to the touch material 43, so that the driving part 41 can drive the touch material 43 to vibrate to finally transmit the vibration signal to the skin, achieving a haptic feedback effect.

There are three implementations for a connection relationship between the magnetic circuit unit 2 and the touch unit 4 in this embodiment.

Figure 3:
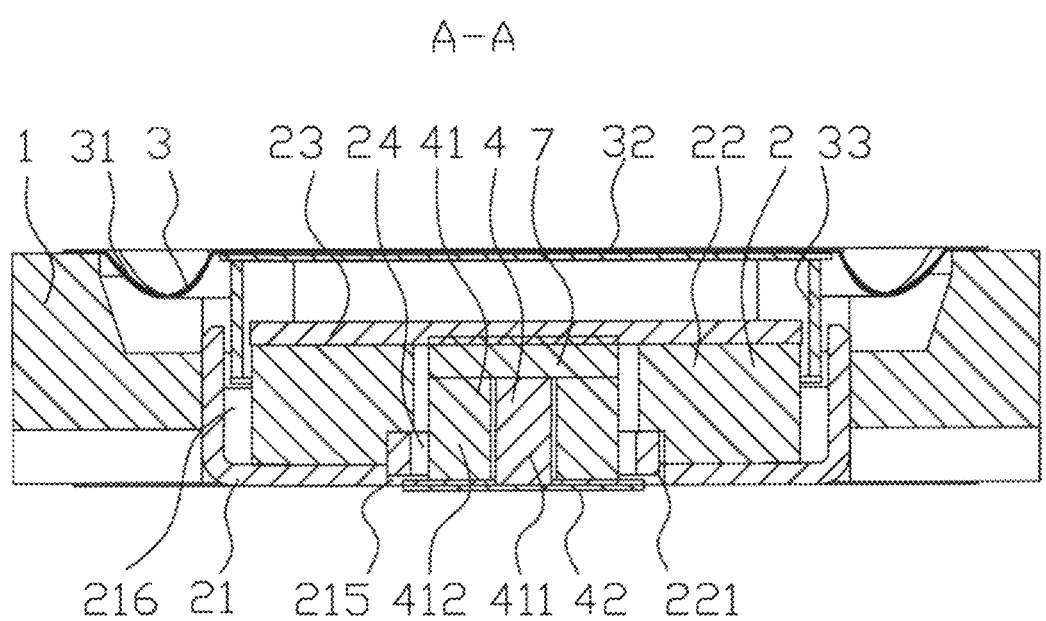
FIG. 3 is a schematic sectional view of the multi-functional feedback device in the first implementation along line A-A in FIG. 2 according to an embodiment of the present disclosure.
Figure 5:
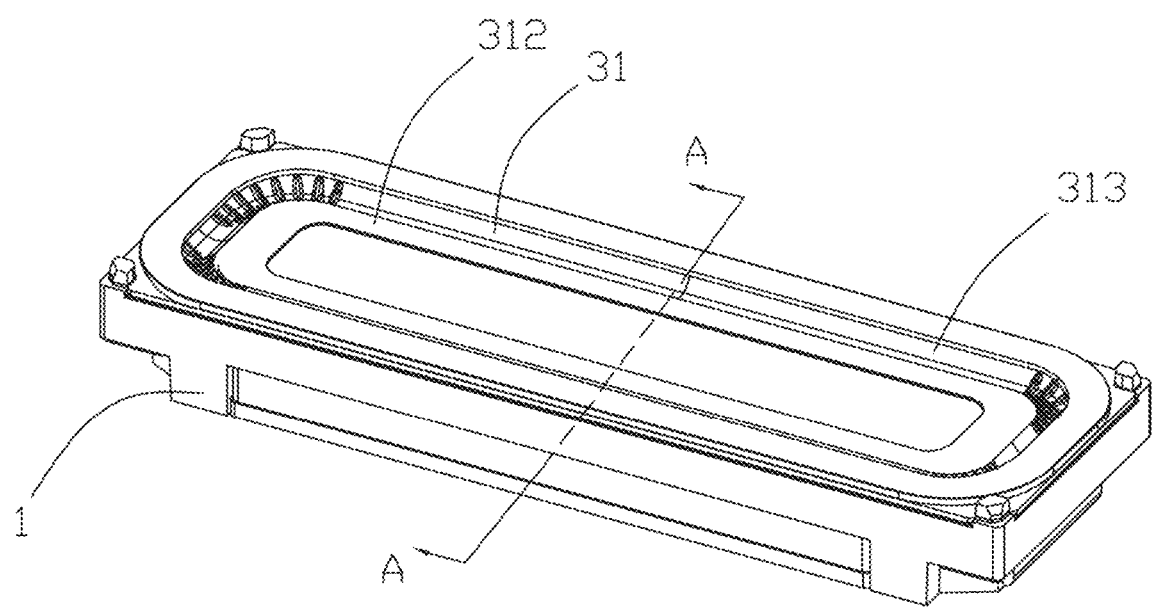
FIG. 5 is a schematic diagram of a three-dimensional structure of a multi-functional feedback device in a third implementation according to an embodiment of the present disclosure.

In a first implementation, referring to FIG. 3 and FIG. 5, the magnetic circuit unit 2 includes a pole plate ring 24 fixed to the magnet 22 and sleeved on the coil 412, and a gap is formed between the pole plate ring 24 and the coil 412. In some embodiments, the magnet 22 is provided with an avoiding groove 221 communicated with the receiving cavity 215, and the pole plate ring 24 is embedded in the avoiding groove 221.

In some embodiments, a top surface of the second flexible printed circuit board 6 is in contact with a bottom surface of the coil 412, the pole plate ring 24 is arranged around an outer side of the coil 412, a height of the pole plate ring 24 is smaller than that of the coil 412, one part of an outer wall of the pole plate ring 24 is in contact with an inner wall of the receiving cavity 215 of the first yoke 21, the other part of the outer wall of the pole plate ring 24 is in contact with an inner wall of the avoiding groove 221, and a gap is formed between an inner wall of the pole plate ring 24 and the coil 412.

Figure 4:
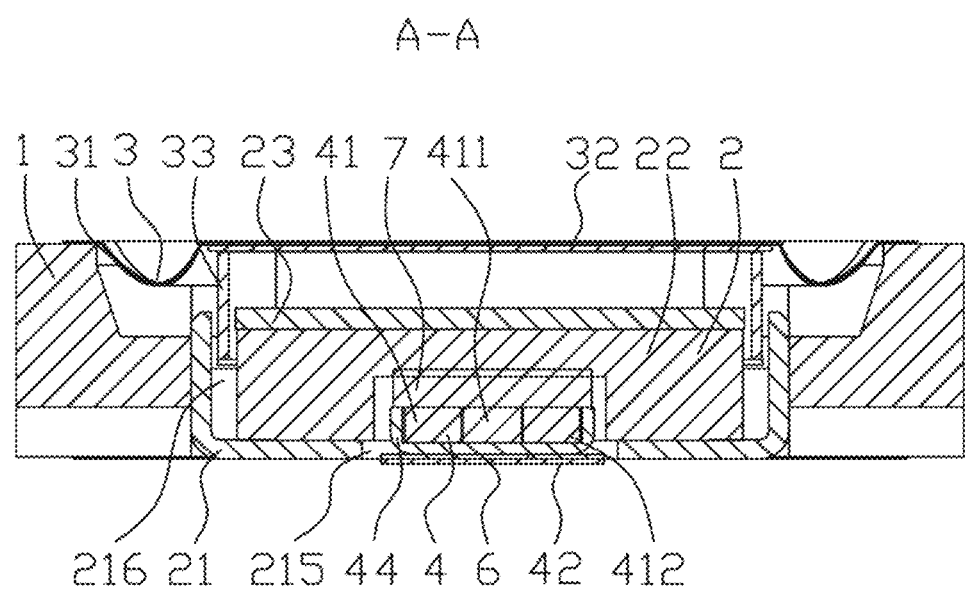
FIG. 4 is a schematic sectional view of the multi-functional feedback device in the second implementation along line A-A in FIG. 2 according to an embodiment of the present disclosure.
Figure 6:
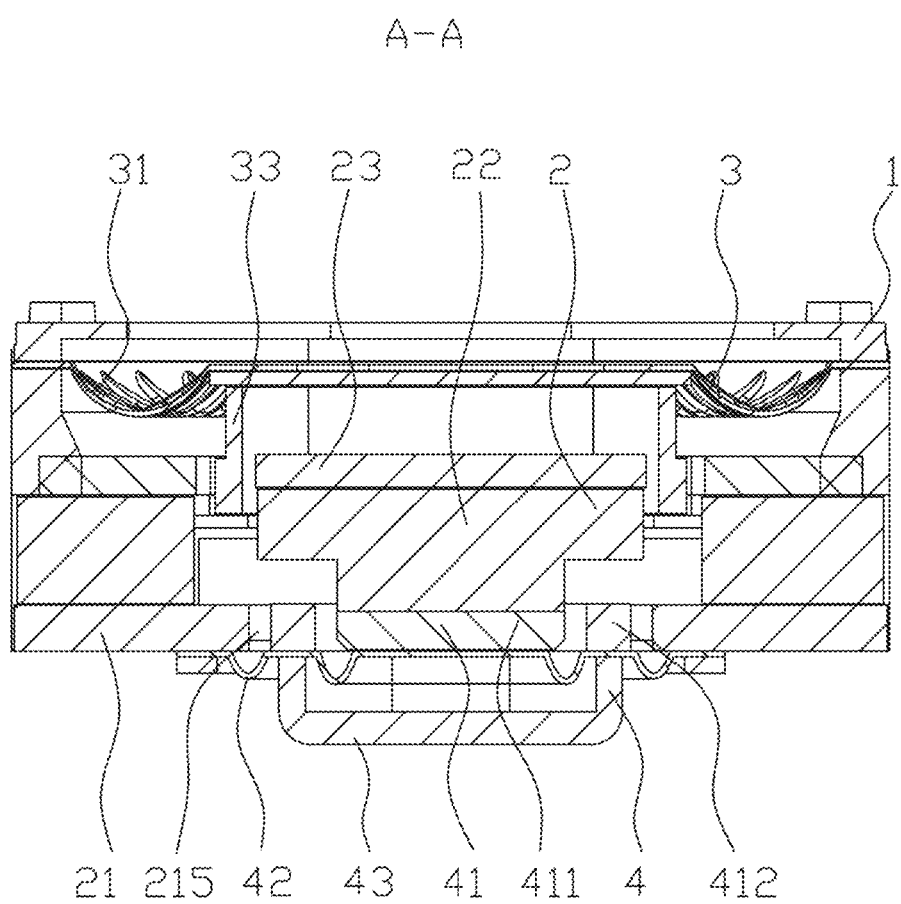
FIG. 6 is a schematic sectional view of the multi-functional feedback device in the third implementation along a line A-A in FIG. 5 according to an embodiment of the present disclosure.
Figure 7:
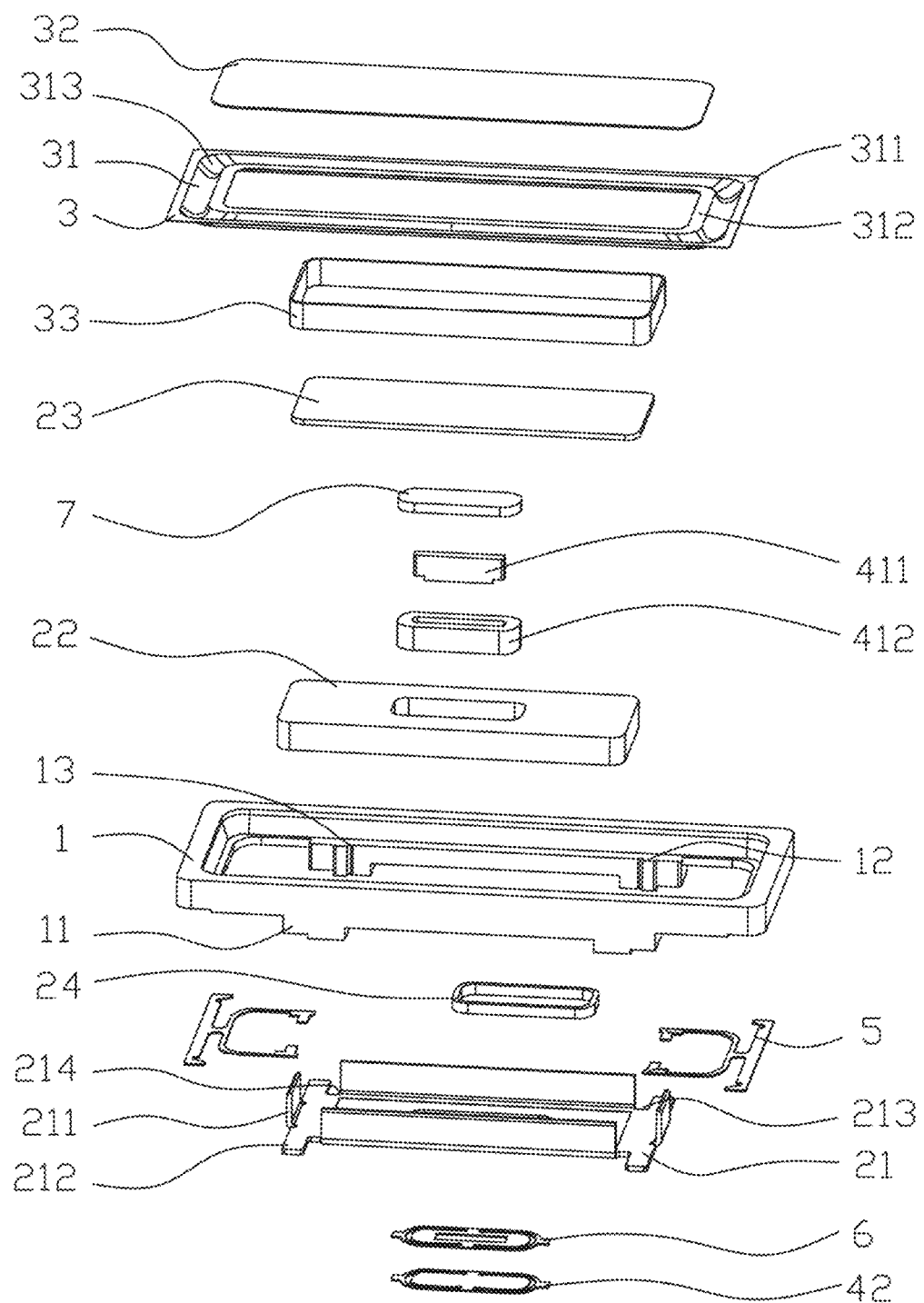
FIG. 7 is a schematic diagram of a three-dimensional exploded structure of the multi-functional feedback device in the first implementation according to an embodiment of the present disclosure.
Figure 8:
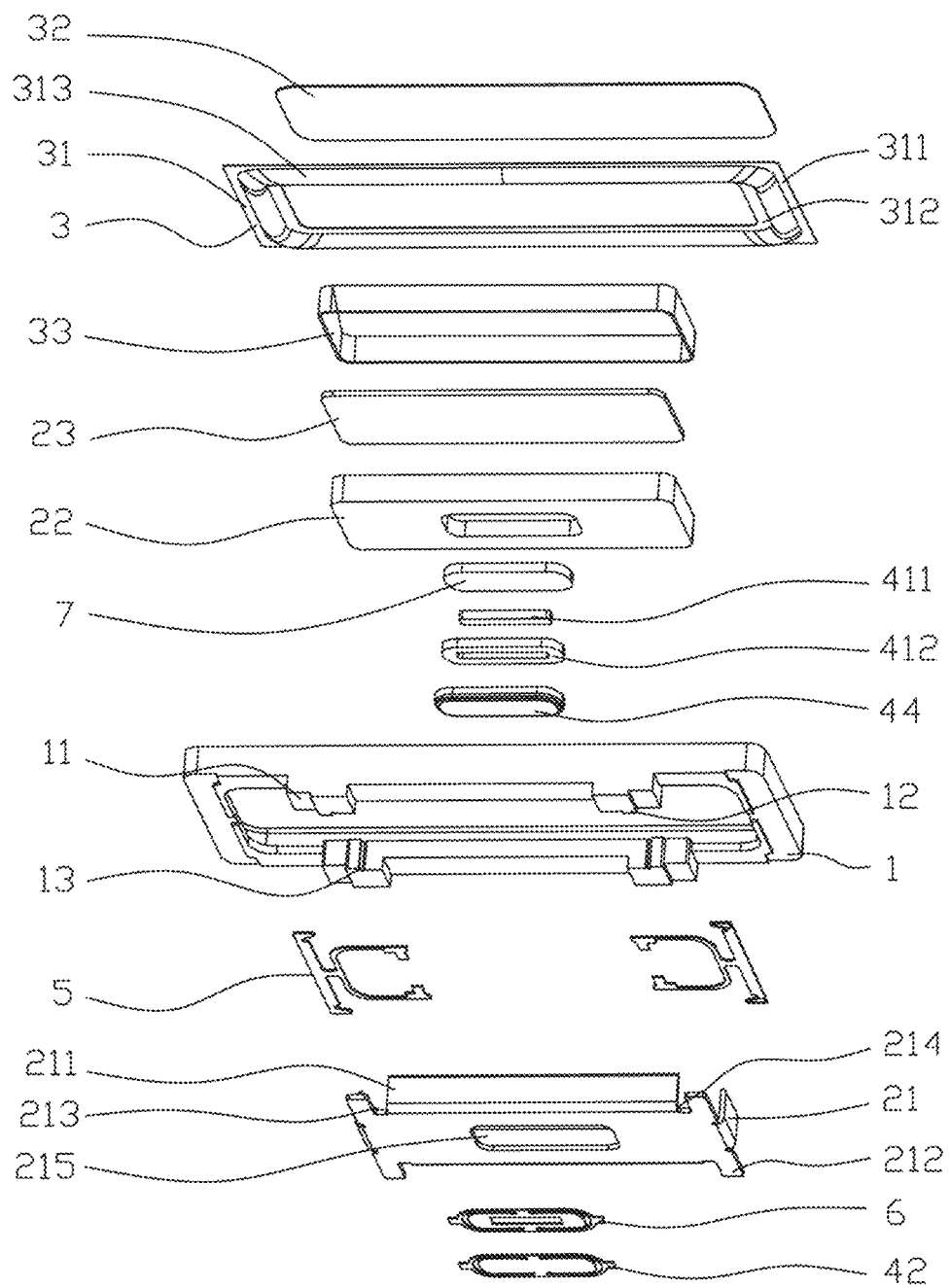
FIG. 8 is a schematic diagram of a three-dimensional exploded structure of the multi-functional feedback device in the second implementation according to an embodiment of the present disclosure.

In a second implementation, referring to FIG. 4 and FIG. 6, the driving part 41 includes a second yoke 44 fixed to the first elastic member 42 and covering the iron core 411 and the coil 412.

In some embodiments, the second yoke 44 is arranged in the receiving cavity 215 of the first yoke 21, the second yoke 44 has a bottom outer surface connected to the second flexible printed circuit board 6 and a bottom inner surface in contact with the driving part 41, and a gap is formed between a side outer surface of the second yoke 44 and the magnet 22.

In a third implementation, the magnet 22 includes a first magnet 222 and a second magnet 223, and the second magnet 223 is arranged on an outer side of the first magnet 222 and has a gap with the first magnet 222. Correspondingly, a first pole plate 231 and a second pole plate 232 are provided, the second pole plate 232 is sleeved on the first pole plate 231, a bottom surface of the first pole plate 231 is in contact with a top surface of the first magnet 222, and a bottom surface of the second pole plate 232 is in contact with a top surface of the second magnet 223. Through the joint action of the first magnet 222 and the second magnet 223, magnetic properties can be enhanced.

In the first implementation and the second implementation, the first elastic member 42 may be a spring, the spring is fixed to a side of the first yoke 21 away from the vibration unit 3, and the spring is attached to the iron core 411 and the coil 412 respectively. The touch material 43 may be a square-shaped polymer soft flexible material such as silica gel or rubber.

The magnetic circuit unit 2 generates a driving force for the driving part 41 to vibrate along the thickness direction, causing the spring to deform and generate an elastic force, and the spring acts on the flexible material, so that the driving part 41 can drive the touch material 43 to vibrate to finally transmit the vibration signal to the skin, achieving a haptic feedback effect.

In the third implementation, the first elastic member 42 may be a sealing film 421, the sealing film 421 is fixed to the side of the first yoke 21 away from the vibration unit 3, and the sealing film 421 is attached to the iron core 411 and the coil 412 respectively. The touch material 43 may be provided as an extrapolation block 431, the extrapolation block 431 may be set to a square cover shape, and the extrapolation block 431 is attached to a side of the sealing film 421 away from the driving part 41 and covers part of the sealing film 421. The extrapolation block 431 may also be made of a material such as silica gel or rubber.

When the first elastic member 42 is set to the sealing film 421, the feedback device can be sealed, and the feedback device is isolated from the outside, which can effectively prevent influence on normal use of the feedback device caused by flowing of external dust or sweat on the skin into the feedback device.

In some embodiments, referring to FIG. 2 to FIG. 6, a magnetic gap 216 is formed between the first yoke 21 and the magnet 22, and the vibration unit 3 includes a diaphragm 31 connected to the frame 1, a dome 32 connected to the diaphragm 31, and a voice coil 33 connected to the dome 32 and inserted in the magnetic gap 216.

In some embodiments, a side of an outer edge of the diaphragm 31 away from the dome 32 is provided with a flange 311 connected to an edge of the frame 1, so as to ensure strength of the connection between the diaphragm 31 and the frame 1, the diaphragm 31 further includes an inner edge 312 connected to the dome 32 and a suspension 313 located between the flange 311 and the inner edge 312, and the suspension 313 protrudes toward one side of the magnetic circuit unit 2. The voice coil 33, after being energized, is driven by the magnetic circuit unit 2 to move perpendicular to a current direction of the voice coil 33, the movement of the voice coil 33 drives the diaphragm 31 to vibrate up and down, and the vibration of the diaphragm 31 pushes the air to vibrate, so that people can hear voices.

In some embodiments, referring to FIG. 2 to FIG. 6, the multi-functional feedback device includes two first flexible printed circuit boards 5 symmetrically arranged on two ends of the magnetic circuit unit 2, and the first flexible printed circuit board 5 has one end fixed to the frame 1 and another end fixedly connected to a side of the voice coil 33 away from the dome 32.

In some embodiments, the first flexible printed circuit board 5 is electrically connected to the voice coil 33. Circuits where the voice coil 33 and the coil 412 are located are independent of each other, so that the voice coil 33 and the coil 412 can operate separately or at the same time, which is convenient for a user to determine whether the coil 412 and the voice coil 33 operate or not in different application scenarios. In other embodiments, a flexible printed circuit board with two disconnected lines may be used, and the two lines are respectively connected to the coil 412 and the voice coil 33, so that energization of the coil 412 and energization of the voice coil 33 may be synchronous or asynchronous, and sound production and vibration can be performed simultaneously or separately.

In some embodiments, referring to FIG. 1 to FIG. 6, the multi-functional feedback device includes a second elastic member 7 arranged between the magnetic circuit unit 2 and the driving part 41.

In some embodiments, the second elastic member 7 may be made of rectangular silica gel. In a first implementation of this embodiment, the silica gel has one side in contact with the pole plate 23 and the other side connected to the driving part 41. In a second implementation, the silica gel has one side in contact with the magnet 22 and the other side connected to the driving part 41. The silica gel may play a protective role when the coil 412 is energized and vibrates. At the same time, due to elasticity, the silica gel connected between the magnetic circuit unit 2 and the driving part 41 can enhance the driving force of the magnetic circuit unit 2 on the driving part 41. In other embodiments, the second elastic member 7 may be provided with a compression spring, an elastic piece, and the like.

Figure 9:
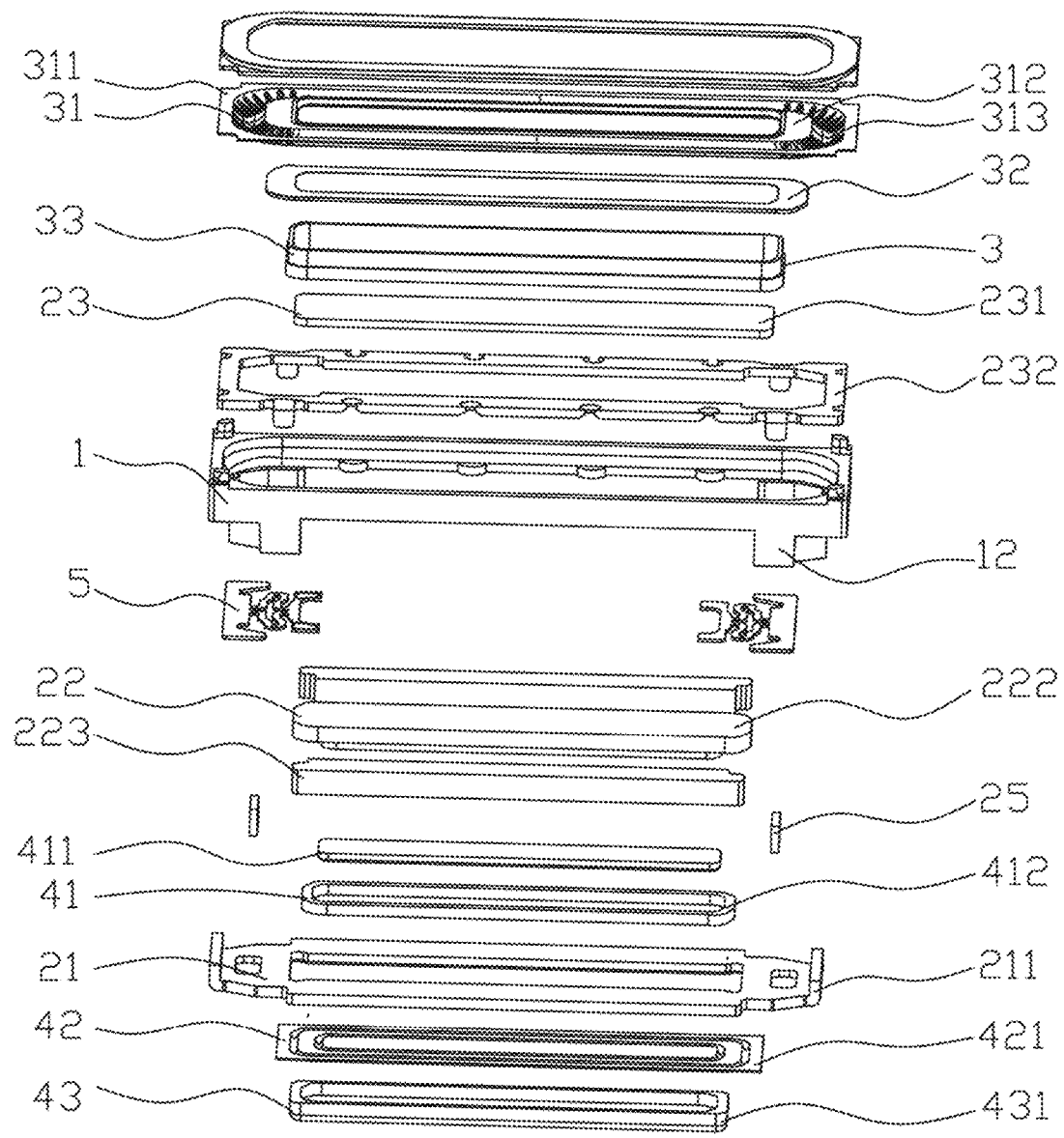
FIG. 9 is a schematic diagram of a three-dimensional exploded structure of the multi-functional feedback device in the third implementation according to an embodiment of the present disclosure.
Figure 10:
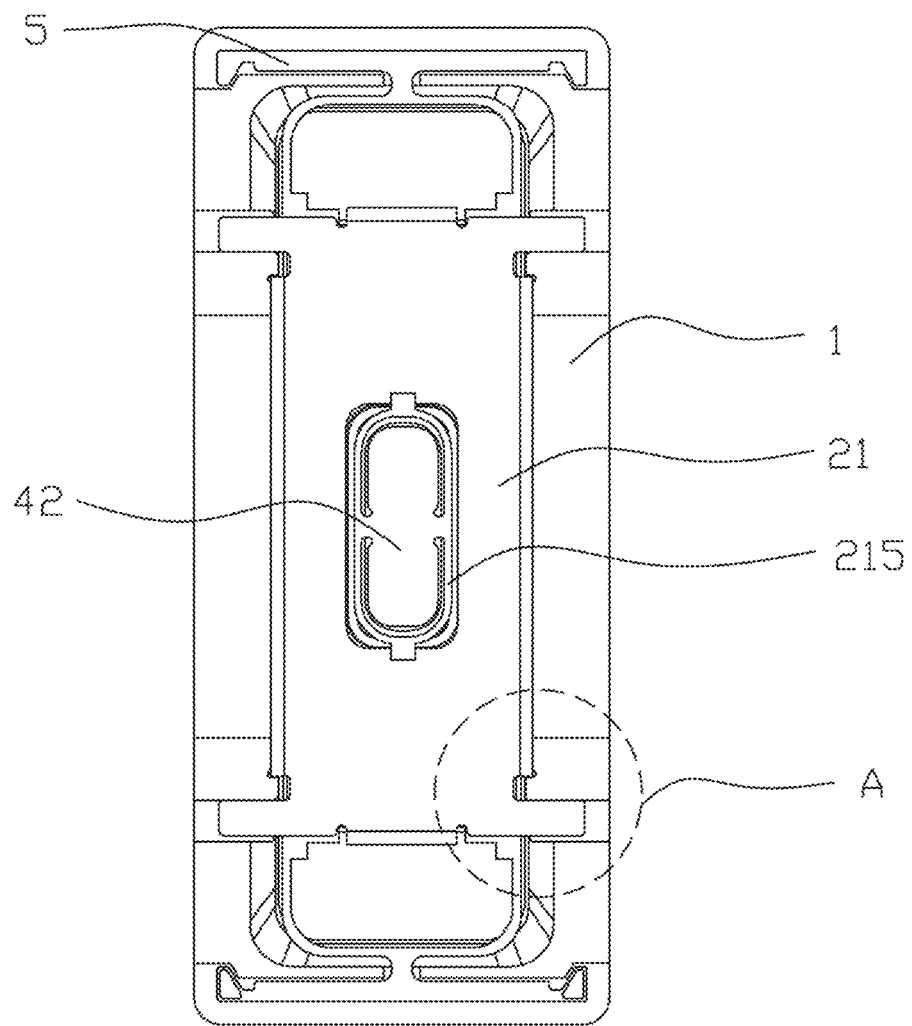
FIG. 10 is a bottom view of the multi-functional feedback device according to an embodiment of the present disclosure.
Figure 11:
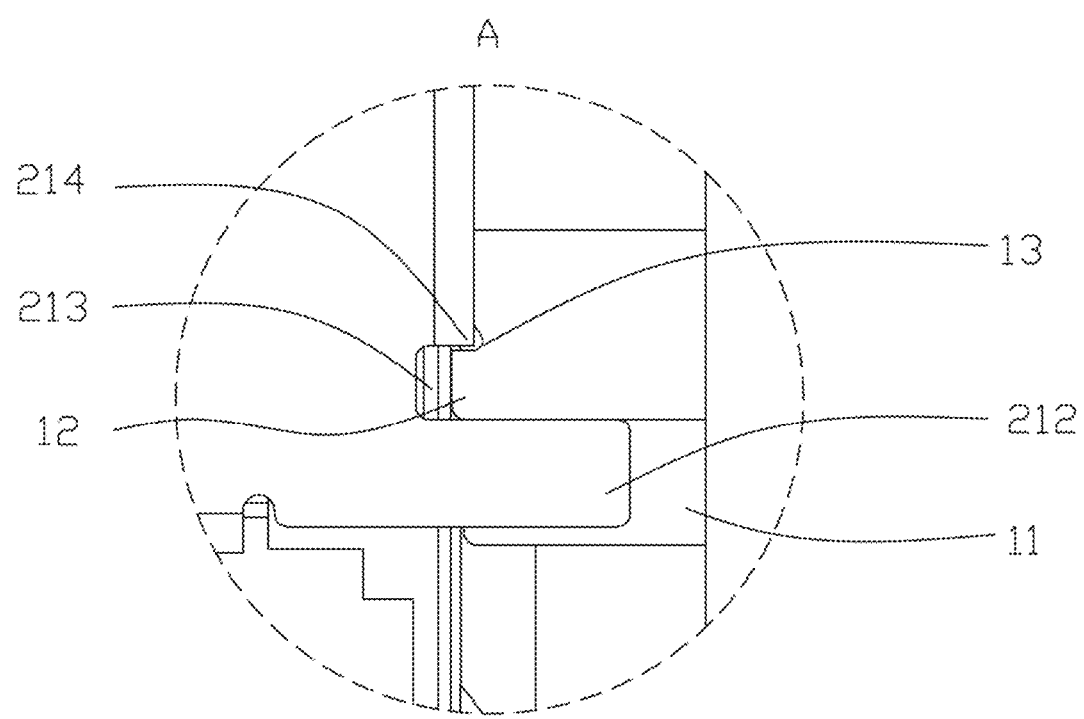
FIG. 11 is an enlarged view of a detail A in FIG. 7.
Figure 12:
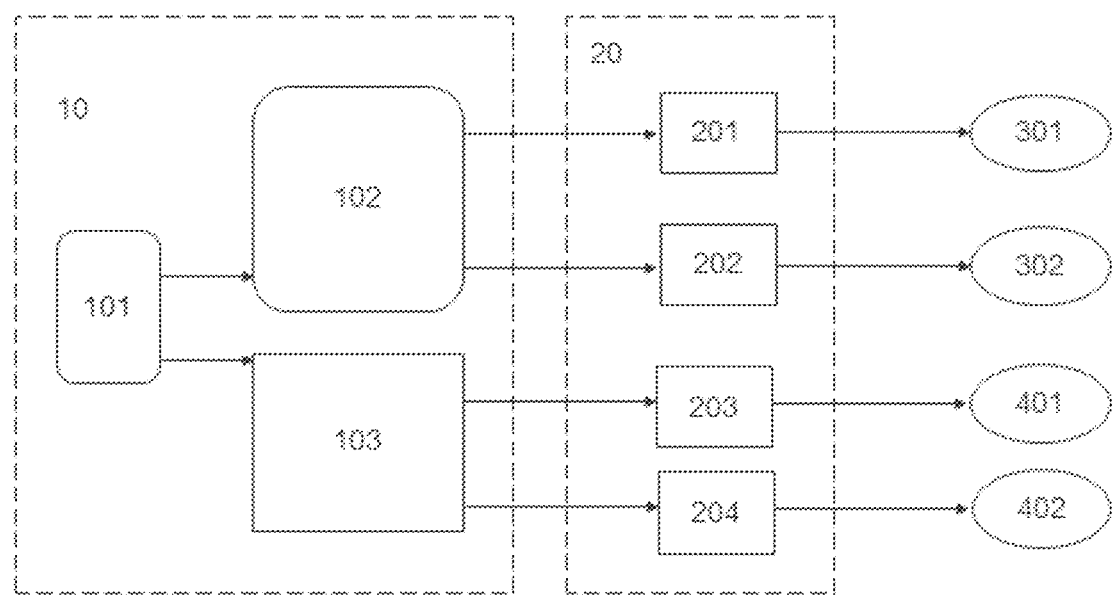
FIG. 12 is a schematic diagram of link composition of a haptic feedback system in an implementation according to an embodiment of the present disclosure.
Figure 13:
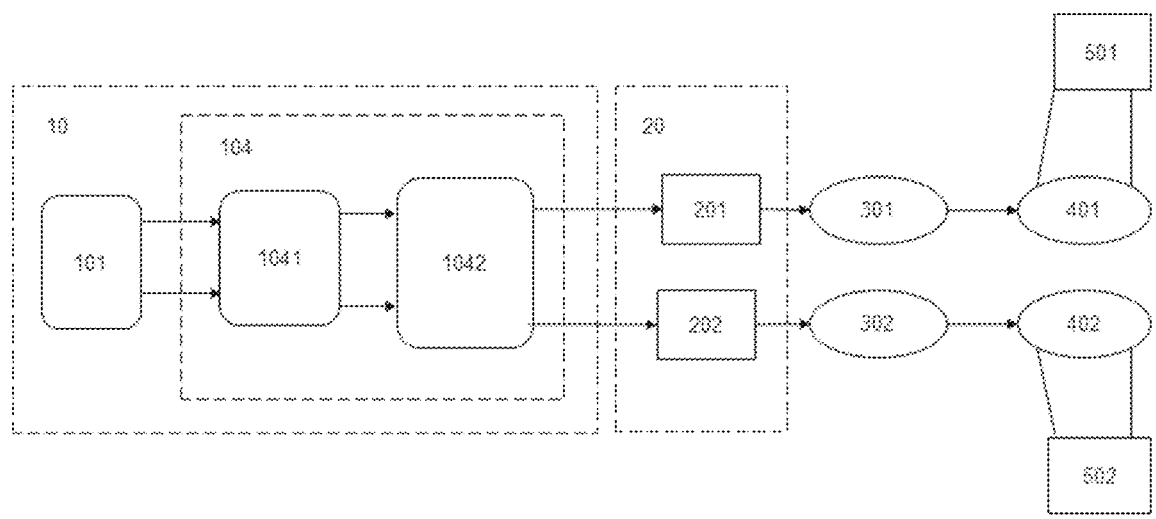
FIG. 13 is a schematic diagram of link composition of the haptic feedback system in another implementation according to an embodiment of the present disclosure.
Figure 14:
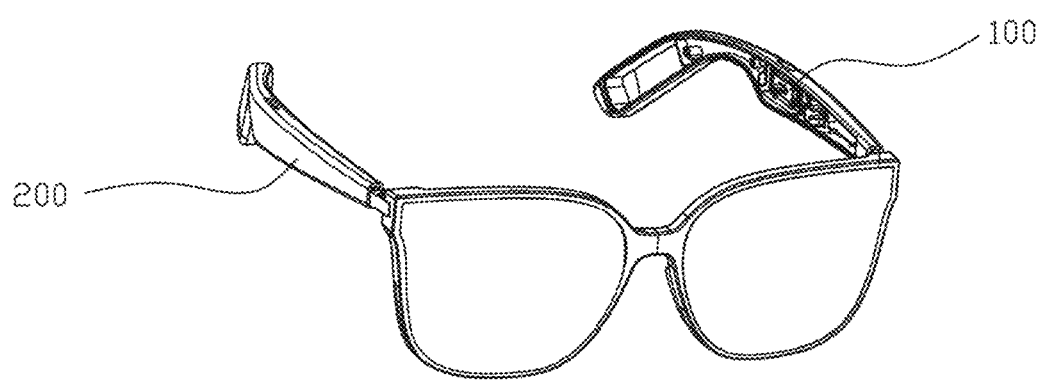
FIG. 14 is a schematic diagram of a partial structure according to an embodiment of the present disclosure.

An embodiment of the present disclosure provides a haptic feedback system, which, referring to FIG. 1 and FIG. 9 to FIG. 10, includes a control processing assembly 10, a power amplifier circuit 20 electrically connected to the control processing assembly 10, and the multi-functional feedback device 100 as described in any one of the above electrically connected to the power amplifier circuit 20. The control processing assembly 10 is configured to receive and process an AR/VR signal to output an audio signal and a touch signal to the power amplifier circuit 20. The power amplifier circuit 20 is configured to perform power amplification on the audio signal and the touch signal. The vibration unit 3 is configured to receive an audio signal after power amplification, and the touch unit 4 is configured to receive a touch signal after power amplification.

In some embodiments, referring to FIG. 1 and FIG. 9, the control processing assembly 10 includes the control processing assembly 10 includes an MCU controller 101, and a first chip processor 102 and a second chip processor 103 that are signal-connected to the MCU controller 101. The power amplifier circuit 20 includes an audio power amplifier circuit 20 electrically connected to the first chip processor 102 and the vibration unit 3 and a motor power amplifier circuit 20 electrically connected to the second chip processor 103 and the touch unit 4. The MCU controller 101 is configured to receive and process the VR/AR signal to obtain a first signal and a second signal. The first chip processor 102 is configured to receive and process the first signal to obtain the audio signal. The second chip processor 103 is configured to receive and process the second signal to obtain the touch signal. The audio power amplifier circuit 20 is configured to perform power amplification on the audio signal. The motor power amplifier circuit 20 is configured to perform power amplification on the touch signal.

In some embodiments, the audio signal includes a left channel audio signal and a right channel audio signal, and the haptic signal includes a left motor haptic signal and a right motor haptic signal. Correspondingly, the audio power amplifier circuit includes a left audio power amplifier circuit 201 and a right audio power amplifier circuit 202. The motor power amplifier circuit includes a left motor power amplifier circuit 203 and a right motor power amplifier circuit 204. The vibration unit 3 includes a left vibration unit 301 and a right vibration unit 302. The touch unit 4 includes a left touch unit 401 and a right touch unit 402.

When the haptic feedback system operates, part of the AR/VA signal is transmitted to the MCU controller 101 through a conventional stereo channel, and is processed by the MCU controller 101 to obtain a first signal which is then sent to the first chip processor 102 to obtain an audio signal, and finally the left channel audio signal power-amplified by the left audio power amplifier circuit 201 is transmitted to the left vibration unit 301, and the right channel audio signal power-amplified by the right audio power amplifier circuit 202 is transmitted to the right vibration unit 302. The haptic feedback system further includes a haptic feedback switch or an intensity adjustment switch. During a game or music, the haptic feedback switch or the intensity adjustment switch is turned on, a low-frequency signal in the AR/VA signal is transmitted to the MCU controller 101 through a low-frequency enhancement control channel, and is processed by the MCU controller 101 to obtain a second signal which is then sent to the second chip processor 103 to obtain a touch signal. The left motor touch signal and the right motor touch signal are amplified by the left motor power amplifier circuit 203 and the right motor power amplifier circuit 204 respectively, then transmitted to the left touch unit 401 and the right touch unit 402 respectively, and finally transmitted to the user's skin, achieving a haptic feedback effect. In this embodiment, the vibration unit 3 and the touch unit 4 are separate power amplifiers, which may perform feedback separately.

The haptic feedback system further includes a memory. The memory stores a haptic feedback effect library, a game music file, and the like. The chip processor adopts a digital signal processing (DSP) chip with a mature application technology and wide application in the current technology, and the power amplifier circuit 20 is a circuit design with mature design and application in the current technology. Therefore, details are not described herein again.

In another implementation, referring to FIG. 1 and FIG. 10, the vibration unit 3 and the touch unit 4 are connected in series, and the haptic feedback system includes a capacitor connected in parallel with the touch unit 4. The control processing assembly 10 includes an MCU controller 101 and a signal processing assembly 104 signal-connected to the MCU controller 101. The power amplifier circuit 20 includes an audio power amplifier circuit 20 electrically connected to the signal processing assembly 104 and the vibration unit 3, and the vibration unit 3 is electrically connected to the audio power amplifier circuit 20. The MCU controller 101 is configured to receive and process the VR/AR signal to obtain a first signal and a second signal. The signal processing assembly 104 is configured to receive and process the first signal and the second signal to obtain a mixed signal, and the mixed signal includes an audio signal corresponding to the first signal and a touch signal corresponding to the second signal. The audio power amplifier circuit 20 is configured to perform power amplification on the mixed signal, and the amplified mixed signal is transmitted to the vibration unit 3 and the touch unit 4 in sequence.

In some embodiments, the haptic feedback system includes a haptic feedback switch or an intensity adjustment switch, and the signal processing assembly 104 includes a mixer 1041 and a third chip processor 1042. During a game or music, the haptic feedback switch or the intensity adjustment switch is turned on, part of the AR/VA signal is transmitted to the MCU controller 101 through a conventional stereo channel and a low-frequency signal therein is transmitted to the MCU controller 101 through a low-frequency enhancement control channel to obtain a first signal and a second signal respectively. The first signal and the second signal are sent to the processing assembly 104. The processing assembly 104 processes the first signal and the second signal to obtain an audio signal and a touch signal respectively, and the audio signal and the touch signal are mixed to obtain a mixed signal. The mixed signal includes a left mixed signal and a right mixed signal. Finally, the left mixed wave signal power-amplified by the left audio power amplifier circuit 201 is transmitted to the left vibration unit 301, and the right mixed signal power-amplified by the right audio power amplifier circuit 202 is transmitted to the right vibration unit 302. The left vibration unit 301 is connected in series with the left touch unit 401, and the right vibration unit 302 is connected in series with the right touch unit 402 to realize common power amplification of the vibration unit 3 and the touch unit 4. The capacitor includes a first capacitor 501 and a second capacitor 502. The left touch unit 401 is connected in parallel with the first capacitor 501, and the right touch unit 402 is connected in parallel with the second capacitor 502, which can achieve a low-pass effect.

In some embodiments, referring to FIG. 9 to FIG. 10, the processing an AR/VR signal to output an audio signal and a touch signal to the power amplifier circuit includes: calling a haptic feedback signal effect library as described in the AR/VR signal to obtain the touch signal. The touch signal is smaller than 80 Hz.

In some embodiments, content of the AR/VR signal is transmitted to the MCU controller 101, and the MCU controller 101 calls the haptic feedback signal effect library as described in a feature signal of the content of the AR/VR signal and matches an effect signal in the haptic feedback signal effect library. After obtaining the second signal, the MCU controller 101 outputs the first signal and the second signal. An experience effect of a signal with a frequency below 80 Hz on a human head is the best, and a signal above 80 Hz is extremely uncomfortable for the human head. Therefore, the touch signal of the present disclosure is smaller than 80 Hz.

An embodiment of the present disclosure provides AR/VR glasses. Referring to FIG. 1 to FIG. 11, the AR/VR glasses includes a glasses frame 200 and the haptic feedback system (not shown in the figure) as described above arranged on the glasses frame 200. The haptic feedback system includes the multi-functional feedback device 100 as described above.

In some embodiments, the glasses frame 200 includes a left leg and a right leg which are respectively provided with a multi-functional feedback device 100. The left vibration unit 301 and the left touch unit 401 are assembled on the left leg, the right vibration unit 302 and the right touch unit 402 are assembled on the right leg, and the touch materials 43 in the multi-functional feedback devices 100 of the two legs are both located on an inner side. When the user wears the AR/VR glasses of the present disclosure and a touch signal is generated, the driving part 41 can drive the touch material 43 to vibrate, and the touch material 43 generates thrust and transmits it to the skin, which can realize a reminder through the vibration on the head and can also meet diverse requirements through sound reminders.

The above descriptions are only embodiments of the present disclosure. It should be pointed out herein that, for those of ordinary skill in the art, improvements can also be made without departing from the concept of the present disclosure, all of which fall within the protection scope of the present disclosure.

What is claimed is:

1. A multi-functional feedback device, comprising:
   a frame,
   a magnetic circuit unit fixed in the frame,
   a vibration unit connected to the frame and driven by the magnetic circuit unit to produce sound along a thickness direction, and
   a touch unit arranged opposite to the vibration unit, wherein the touch unit comprises a driving part spaced apart from the magnetic circuit unit and driven by the magnetic circuit unit to vibrate along the thickness direction, a first elastic member connected to the driving part and fixed to the frame, and a touch material attached to a side of the first elastic member away from the driving part;
   wherein the magnetic circuit unit comprises a first yoke fixedly connected to the frame, a magnet fixed in the first yoke, and a pole plate fixed to a side of the magnet close to the vibration unit, wherein the first yoke has a receiving cavity, and the driving part is received in the receiving cavity;
   wherein the driving part comprises an iron core fixedly assembled to a side of the first elastic member away from the touch material, and a coil sleeved on the iron core, wherein the iron core and the coil are both accommodated in the receiving cavity.

2. The multi-functional feedback device as described in claim 1, wherein the magnetic circuit unit further comprises a pole plate ring fixed to the magnet and sleeved on the coil, wherein a gap is formed between the pole plate ring and the coil.

3. The multi-functional feedback device as described in claim 2, wherein the magnet is provided with an avoiding groove communicated with the receiving cavity, and the pole plate ring is embedded in the avoiding groove.

4. The multi-functional feedback device as described in claim 1, wherein the driving part further comprises a second yoke fixed to the first elastic member and covering the iron core and the coil.

5. The multi-functional feedback device as described in claim 1, wherein the first elastic member comprises a sealing film, wherein the sealing film is fixed to a side of the first yoke away from the vibration unit and is attached to the iron core and the coil respectively.

6. The multi-functional feedback device as described in claim 5, wherein the touch material comprises an extrapolation block, the extrapolation block being fixed to a side of the sealing film away from the iron core and the coil.

7. The multi-functional feedback device as described in claim 6, wherein the magnetic circuit unit further comprises a connector fixed between the pole plate and the first yoke.

8. The multi-functional feedback device as described in claim 1, wherein a magnetic gap is formed between the first yoke and the magnet, and the vibration unit comprises a diaphragm connected to the frame, a dome connected to the diaphragm, and a voice coil connected to the dome and inserted in the magnetic gap.

9. The multi-functional feedback device as described in claim 8, further comprising:
   two first flexible printed circuit boards symmetrically arranged at two ends of the magnetic circuit unit, respectively, wherein one of the two first flexible printed circuit boards has one end fixed to the frame and another end fixedly connected to a side of the voice coil away from the dome.

10. The multi-functional feedback device as described in claim 1, further comprising:
    a second elastic member arranged between the magnetic circuit unit and the driving part.

* * * * *